US012104545B1

(12) United States Patent
Volmerding

(10) Patent No.: US 12,104,545 B1
(45) Date of Patent: Oct. 1, 2024

(54) ESTIMATING BIODIESEL BLEND USING VIRTUAL SENSORS AND VIRTUAL SENSING METHODS

(71) Applicant: Cummins Emission Solutions Inc., Columbus, IN (US)

(72) Inventor: Matthew K. Volmerding, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/391,969

(22) Filed: Dec. 21, 2023

(51) Int. Cl.
*F02D 13/00* (2006.01)
*F01N 3/20* (2006.01)
*F01N 11/00* (2006.01)
*F02D 19/06* (2006.01)

(52) U.S. Cl.
CPC ....... *F02D 19/0652* (2013.01); *F01N 3/2033* (2013.01); *F01N 11/002* (2013.01); *F02D 19/0636* (2013.01); *F01N 2610/03* (2013.01); *F01N 2900/1404* (2013.01)

(58) Field of Classification Search
CPC ............. F02D 19/0652; F02D 19/0636; F01N 3/2033; F01N 11/002; F01N 2610/03; F01N 2900/1404
See application file for complete search history.

(56) References Cited

U.S. PATENT DOCUMENTS 7,159,623 B1 1/2007 Carr et al.
8,607,623 B2 12/2013 Ciaravino et al.
8,813,690 B2 8/2014 Kumar et al.
9,255,542 B2 2/2016 Kurtz et al.
10,982,614 B2 4/2021 Fulton et al.
(Continued)

FOREIGN PATENT DOCUMENTS

GB 2 474 512 A 4/2011
GB 2 502 366 A 11/2013
WO WO-2011/082373 A2 7/2011

OTHER PUBLICATIONS

B. Tesfa et al., "LHV Predication Models and LHV Effect on the Performance of CI Engine Running with Biodiesel Blends", University of Huddersfield Repository, Energy Conversion and Management, 2013, 71. pp. 217-226. ISSN 0196-8904.
(Continued)

*Primary Examiner* — Phutthiwat Wongwian
*Assistant Examiner* — Sherman D Manley
(74) *Attorney, Agent, or Firm* — Foley & Lardner LLP

(57) ABSTRACT

A method can include controlling, by at least one controller, an amount of hydrocarbons provided upstream of a diesel oxidation catalyst. The method can include determining, by the at least one controller, a first temperature of exhaust gas at an inlet of the diesel oxidation catalyst. The exhaust gas can be produced from combustion of fuel. The method can include determining, by the at least one controller, a second temperature of the exhaust gas at an outlet of the diesel oxidation catalyst. The method can include calculating, by the at least one controller, a lower heating value of the fuel based on the first temperature, the second temperature, the amount of hydrocarbons, and a flow rate of the exhaust gas. The method can include estimating, by the at least one controller, a percentage of biodiesel in the fuel based on the lower heating value.

20 Claims, 5 Drawing Sheets

(56) References Cited

U.S. PATENT DOCUMENTS

| | | | | |
|---|---|---|---|---|
| 2008/0000450 | A1* | 1/2008 | Serra | F02D 19/0652 123/434 |
| 2010/0204905 | A1* | 8/2010 | Taniguchi | F02D 19/088 60/287 |
| 2011/0060497 | A1 | 3/2011 | Cummings et al. | |
| 2011/0125383 | A1* | 5/2011 | Vassallo | G01N 33/2835 701/99 |
| 2011/0173957 | A1 | 7/2011 | Funk | |
| 2011/0208409 | A1 | 8/2011 | Snyder et al. | |
| 2014/0222314 | A1* | 8/2014 | Kurtz | F02D 41/403 701/104 |
| 2019/0368428 | A1 | 12/2019 | Wirkowski | |
| 2024/0003306 | A1* | 1/2024 | Cordisco | F01N 3/025 |

OTHER PUBLICATIONS

Sparks et al. "Monitoring and Blending Biofuels Using a Microfluidic Sensor," Journal of ASTM International, vol. 7, No. 8, Aug. 2010; https://metersolution.com/monitoring-blending-biofuels-using-microfluidic-sensor.

Williams et al., Impact of Biodiesel Impurities on the Performance and Durability of DOC, DPF and SCR Technologies, Presented at the SAE 2011 world Congress Detroit, Michigan, Apr. 12-14, 2011.

* cited by examiner

| Fuel Blend | LHV (MJ/kg) | DOC Out Temp (deg C) |
|---|---|---|
| B100 | 37.5 | 503.0 |
| B50 | 40.1 | 517.1 |
| B20 | 41.7 | 525.8 |
| Std Diesel | 42.7 | 531.2 |
| HVO | 44 | 538.2 |

ESTIMATING BIODIESEL BLEND USING VIRTUAL SENSORS AND VIRTUAL SENSING METHODS

TECHNICAL FIELD

The present disclosure relates to biodiesel virtual sensors. More specifically, the present disclosure relates to estimating a percentage of biodiesel in fuel using virtual sensors and virtual sensing methods.

BACKGROUND

Exhaust aftertreatment systems are used to receive and treat exhaust gas generated by engines such as internal combustion (IC) engines. Exhaust gas aftertreatment systems include any of several different components to reduce the levels of harmful exhaust emissions present in exhaust gas. Such aftertreatment systems may include a selective catalytic reduction (SCR) system.

SUMMARY

The biodiesel fuel quality (e.g., blend quality) and/or tampering status of a physical sensor can be determined using virtual sensors and/or sensing methods. The virtual sensor can be used to determine the biodiesel fuel quality by using sensors that may already exist in the aftertreatment system and without using a dedicated sensor for measuring the fuel quality. The virtual sensor can be used for engine fuel control, aftertreatment aging/poisoning prognostics or health monitors, hydrocarbon dosing control adjustments, and adding confidence to a physical fuel quality sensor.

At least one aspect of the present disclosure is directed to a non-transitory computer-readable media having computer-readable instructions stored thereon that, when executed by at least one controller, cause the at least one controller to control an amount of hydrocarbons provided upstream of a diesel oxidation catalyst (DOC). The at least one controller can determine a first temperature of exhaust gas at an inlet of the DOC. The exhaust gas can be produced from combustion of fuel. The at least one controller can determine a second temperature of the exhaust gas at an outlet of the DOC. The at least one controller can calculate a lower heating value (LHV) of the fuel based on the first temperature, the second temperature, the amount of hydrocarbons, and a flow rate of the exhaust gas. The at least one controller can estimate a percentage of biodiesel in the fuel based on the LHV.

Another aspect of the present disclosure is directed to an aftertreatment system. The aftertreatment system can include a DOC. The aftertreatment system can include at least one controller. The at least one controller can control an amount of hydrocarbons provided upstream of DOC. The at least one controller can determine a first temperature of exhaust gas at an inlet of the DOC. The exhaust gas can be produced from combustion of fuel. The at least one controller can determine a second temperature of the exhaust gas at an outlet of the DOC. The at least one controller can calculate an LHV of the fuel based on the first temperature, the second temperature, the amount of hydrocarbons, and a flow rate of the exhaust gas. The at least one controller can estimate a percentage of biodiesel in the fuel based on the LHV.

Another aspect of the present disclosure is directed to a method. The method can include controlling, by at least one controller, an amount of hydrocarbons provided upstream of a DOC. The method can include determining, by the at least one controller, a first temperature of exhaust gas at an inlet of the DOC. The exhaust gas can be produced from combustion of fuel. The method can include determining, by the at least one controller, a second temperature of the exhaust gas at an outlet of the DOC. The method can include calculating, by the at least one controller, an LHV of the fuel based on the first temperature, the second temperature, the amount of hydrocarbons, and a flow rate of the exhaust gas. The method can include estimating, by the at least one controller, a percentage of biodiesel in the fuel based on the LHV.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

Figure 1:
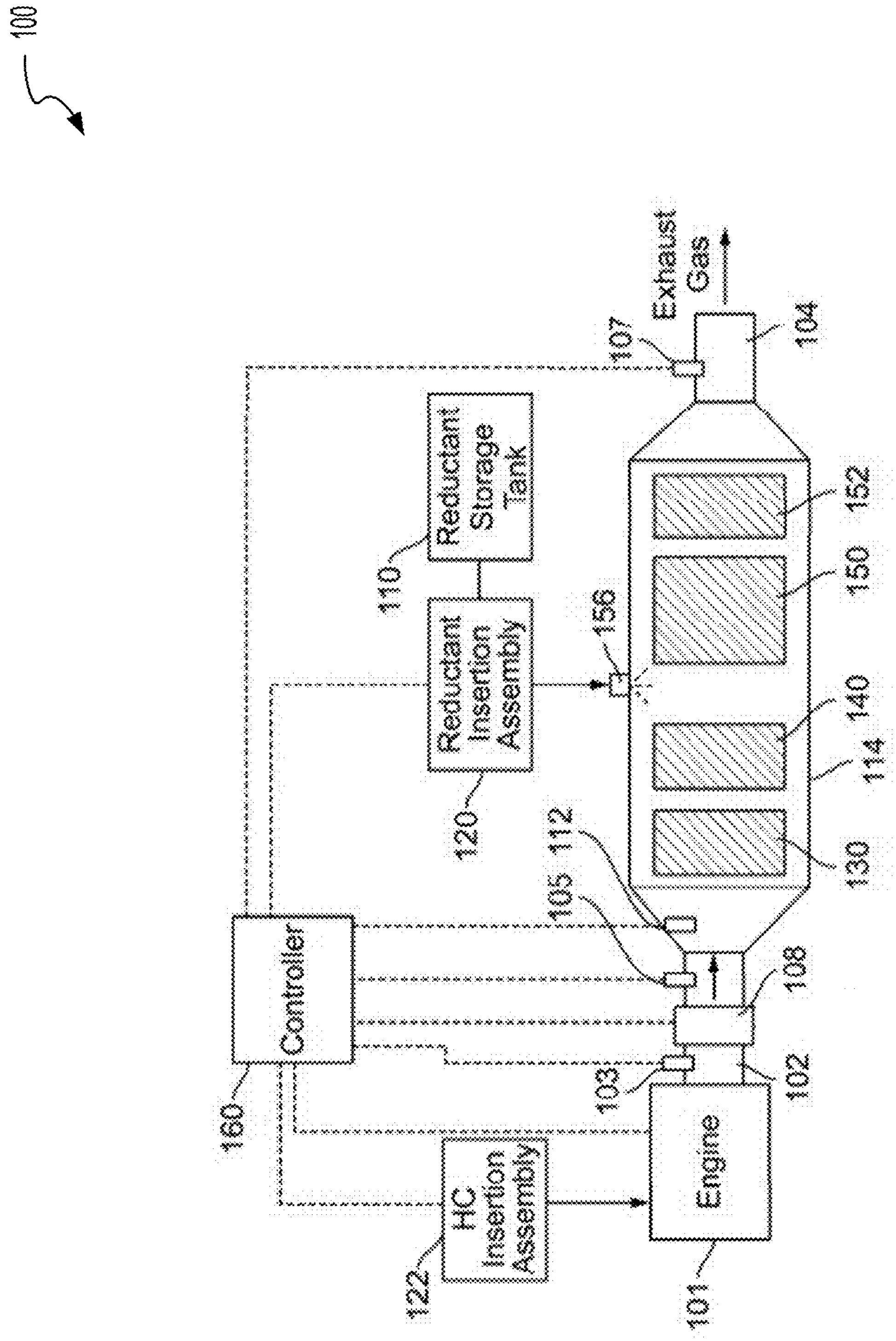
FIG. 1 illustrates a schematic diagram of an aftertreatment system, according to an example implementation.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Renewable fuel can be part of the transition to zero carbon emissions. Biodiesel is a biodegradable, renewable fuel that is derived from animals or plants. It can be manufactured from animal fats, vegetable oils, or recycled restaurant grease and can be used to fuel compression-ignition engines. Petroleum-based diesel can be blended with biodiesel to form a biodiesel blend, which can be referred by its percentage of biodiesel (e.g., 100% biodiesel is labeled B100, 20% biodiesel is labeled B20, 10% biodiesel is labeled B10, 7% biodiesel is labeled B7, 5% biodiesel is labeled B5, 2% biodiesel is labeled B2, etc.).

To determine a biodiesel fuel quality (e.g., percentage of biodiesel in the fuel), a physical sensor to measure the biodiesel fuel quality may be used. However, physical sensors that are configured to measure fuel quality (e.g., fuel quality sensors) can be expensive as well as prone to error and tampering.

Various embodiments described herein may provide one or more advantages, including, for example: (1) improved engine fuel control; (2) monitoring the aftertreatment system; (3) offering prognostics for aftertreatment system aging and/or poisoning; (4) optimizing hydrocarbon dosing amounts; (5) adding confidence to a physical fuel quality sensor; (6) higher accuracy compared to physical fuel quality sensors; (7) using less fuel compared to a specific regeneration event; (8) improving engine performance; (9) determining tampering status of a physical sensor; and (9) lowering cost compared to physical fuel quality sensors.

Overview of Exhaust Gas Aftertreatment Systems

FIG. 1 depicts an aftertreatment system 100. The aftertreatment system 100 is configured to receive exhaust gas (e.g., diesel exhaust gas, etc.) from an engine 101 (e.g., motor, etc.) and treat constituents (e.g., $NO_x$, CO, $CO_2$, etc.) of the exhaust gas. The aftertreatment system 100 may also include an inlet conduit 102, a first temperature sensor 103, an outlet conduit 104, a second temperature sensor 105, an outlet sensor 107, a reductant storage tank 110, a gas sensor 112, a reductant insertion assembly 120, a hydrocarbon insertion assembly 122, an oxidation catalyst 130, a filter 140, a selective catalytic reduction (SCR) system 150, a reductant port 156, an ammonia oxidation ($AMO_x$) catalyst 152, a controller 160, and/or a heater 108.

The engine 101 may include, for example, a diesel engine, a gasoline engine, a natural gas engine, a dual fuel engine, a biodiesel engine, an E-85 engine, or any other suitable engine. The engine 101 combusts fuel and generates an exhaust gas that includes $NO_x$, CO, $CO_2$, and other constituents. The engine 101 may include other components, for example, a transmission, fuel insertion assemblies, a generator or alternator to convert the mechanical power produced by the engine into electrical power (e.g., to power the heater 108, the gas sensor 112, the reductant insertion assembly 120, the hydrocarbon insertion assembly 122, and the controller 160, etc.).

The aftertreatment system 100 may include a housing 114 (e.g., casing, cover, container, shell, etc.) in which various aftertreatment components of the aftertreatment system 100 are disposed. The housing 114 may be formed from a rigid, heat-resistant and corrosion-resistant material, for example stainless steel, iron, aluminum, metals, ceramics, or any other suitable material. The housing 114 may have any suitable cross-section, for example, circular, square, rectangular, oval, elliptical, polygonal, or any other suitable shape.

The aftertreatment system 100 may include an inlet conduit 102 (e.g., channel, duct, pipe, tube, chute, etc.) that is fluidly coupled to an inlet of the housing 114 and structured to receive exhaust gas from the engine 101 and communicate the exhaust gas to an internal volume defined by the housing 114. Furthermore, an outlet conduit 104 (e.g., channel, duct, pipe, tube, chute, etc.) may be coupled to an outlet of the housing 114 and structured to expel treated exhaust gas into the environment (e.g., treated to remove particulate matter such as soot by the filter 140 and/or reduce constituents of the exhaust gas such as $NO_x$ gases, CO, unburnt hydrocarbons, etc. included in the exhaust gas by the SCR system 150 and the oxidation catalyst 130).

The aftertreatment system 100 may include a heater 108 (e.g., ceramic heater, electric heater, etc.) that is disposed upstream of the other aftertreatment components, for example, in the inlet conduit 102 proximate to an engine exhaust manifold (e.g., at an outlet of a turbo coupled to the engine 101). The heater 108 may be an electrical heater, which may have an input voltage in a range of 36 to 52 V and a heater power in a range of 10 to 100 KW (i.e., the electrical power consumed by the heater 108 to generate heat). As used herein, a range of X to Y includes X, Y, and values between X and Y. In some embodiments, the heater 108 is a 48 V, 10 KW electric heater. The heater 108 is configured to selectively heat the exhaust gas entering the aftertreatment system 100, such that heating of the exhaust gas by the heater 108 causes an increase in a temperature of a heating element of the gas sensor 112 as the heated exhaust gas flows over the gas sensor 112. For example, the heater 108 can be selectively activated to heat the exhaust gas flowing therethrough towards the gas sensor 112 and the aftertreatment components, and thereby heat the gas sensor 112, as well as downstream aftertreatment components (e.g., heat the oxidation catalyst 130 to a light-off temperature, heat the SCR system 150 to its operating temperature, etc.).

The aftertreatment system 100 may include a first temperature sensor 103 (e.g., detector, indicator, etc.). The first temperature sensor 103 may be positioned in the inlet conduit 102 upstream of the heater 108. The first temperature sensor 103 is configured to measure an upstream exhaust gas temperature of the exhaust gas upstream of the heater 108. In some embodiments, a second temperature sensor 105 (e.g., detector, indicator, etc.) is also disposed downstream of the heater 108, for example, proximate to an outlet of the heater 108 and configured to measure a downstream exhaust gas temperature of the exhaust gas downstream of the heater 108. In some embodiments, other sensors, for example, pressure sensors, oxygen sensors, and/or any other sensors configured to measure one or more operational parameters of the exhaust gas entering the aftertreatment system 100 may be disposed in the inlet conduit 102. In some embodiments, each of the first temperature sensor 103 and the second temperature sensor 105 may be excluded, and instead, the upstream and downstream exhaust gas temperatures may be determined virtually (e.g., by the controller 160), using equations, algorithms, or look up tables, for example, based on operating parameters of the engine 101 exhaust gas flow rate, heater power consumed, etc.

The aftertreatment system 100 may include an oxidation catalyst 130. The oxidation catalyst 130 is disposed downstream of the heater 108 in the housing 114 and configured to decompose unburnt hydrocarbons and/or CO included in the exhaust gas. In some embodiments, the oxidation catalyst 130 may include a diesel oxidation catalyst. The hydrocarbon insertion assembly 122 is configured to selectively insert hydrocarbons (e.g., the same fuel that is being consumed by the engine 101) upstream of the oxidation catalyst 130, for example, into the engine 101. When a temperature of the oxidation catalyst 130 is equal to or above a light-off temperature of the oxidation catalyst 130, the oxidation catalyst 130 catalyzes combustion of the inserted hydrocarbons so as to cause an increase in the temperature of the exhaust gas. The oxidation catalyst 130 may catalyze ignition of the hydrocarbon so as to increase a temperature of the exhaust gas for regenerating the oxidation catalyst 130 and/or regenerating other elements within the housing 114. In some embodiments, the hydrocarbon insertion assembly 122 may be selectively activated (e.g., by the controller 160) to insert hydrocarbons into the oxidation catalyst 130 for heating the exhaust gas and thereby, the downstream filter 140 and SCR system 150. The hydrocarbon insertion assembly 122 can selectively inject hydrocarbons (e.g., fuel) upstream of the oxidation catalyst 130. In some embodiments, insertion of the hydrocarbons may heat the exhaust gas to a sufficient temperature to regenerate the filter 140 by burning off particulate matter that may have accumulated on the filter 140, and/or regenerate the SCR system 150 by evaporating reductant deposits deposited on the SCR system 150 or internal surfaces of the aftertreatment system 100.

The aftertreatment system 100 may include a gas sensor 112 (e.g., a $NO_x$ sensor, detector, indicator, etc.) that is disposed in the housing 114 downstream of the heater 108 and upstream of any aftertreatment component that treats the constituents of the exhaust gas. For example, as shown in FIG. 1, the gas sensor 112 is disposed downstream of the heater 108 and upstream of the oxidation catalyst 130.

The aftertreatment system 100 may include an outlet sensor 107 (e.g., detector, indicator, etc.). The outlet sensor 107 may be positioned in the outlet conduit 104. The outlet sensor 107 may comprise a second $NO_x$ sensor configured to determine an amount of $NO_x$ gases expelled into the environment after passing through the SCR system 150. In other embodiments, the outlet sensor 107 may comprise a particulate matter sensor configured to determine an amount of particulate matter (e.g., soot included in the exhaust gas exiting the filter 140) in the exhaust gas being expelled into the environment. In still other embodiments, the outlet sensor 107 may comprise an ammonia sensor configured to measure an amount of ammonia in the exhaust gas flowing out of the SCR system 150, i.e., determine the ammonia slip. The $AMO_x$ catalyst 152 may be positioned downstream of the SCR system 150 and formulated to decompose any unreacted ammonia that flows past the SCR system 150.

The aftertreatment system 100 may include a filter 140 (e.g., mesh, separator, etc.) that is disposed downstream of the oxidation catalyst 130 and upstream of the SCR system 150 and configured to remove particulate matter (e.g., soot, debris, inorganic particles, etc.) from the exhaust gas. In some embodiments, the filter 140 may include a ceramic filter. In some embodiments, the filter 140 may include a cordierite filter which can, for example, be an asymmetric filter. In yet other embodiments, the filter 140 may be catalyzed. The filter 140 can include a diesel particulate filter.

The aftertreatment system 100 may include a SCR system 150 that is configured to decompose constituents of an exhaust gas flowing therethrough in the presence of a reductant, as described herein. In some embodiments, the SCR system 150 may include a selective catalytic reduction filter (SCRF). The SCR system 150 includes a SCR catalyst configured to catalyze decomposition of the $NO_x$ gases into its constituents in the presence of a reductant. Any suitable SCR catalyst may be used such as, for example, platinum, palladium, rhodium, cerium, iron, manganese, copper, vanadium-based catalyst, any other suitable catalyst, or a combination thereof. The SCR catalyst may be disposed on a suitable substrate such as, for example, a ceramic (e.g., cordierite) or metallic (e.g., kanthal) monolith core that can, for example, define a honeycomb structure. A washcoat can also be used as a carrier material for the SCR catalyst. Such washcoat materials may comprise, for example, aluminum oxide, titanium dioxide, silicon dioxide, any other suitable washcoat material, or a combination thereof.

Although FIG. 1 shows only the oxidation catalyst 130, the filter 140, the SCR system 150, and the $AMO_x$ catalyst 152 disposed in the internal volume defined by the housing 114, in other embodiments, a plurality of aftertreatment components may be disposed in the internal volume defined by the housing 114 in addition to, or in place of the oxidation catalyst 130, the filter 140, the SCR system 150, and the $AMO_x$ catalyst 152. Such aftertreatment components may include, for example, a two-way catalyst, mixers, baffle plates, secondary filters (e.g., a secondary partial flow or catalyzed filter) and/or any other suitable aftertreatment component.

The aftertreatment system 100 may include a reductant port 156 (e.g., opening, outlet, etc.). The reductant port 156 may be positioned on a sidewall of the housing 114 and structured to allow insertion of a reductant therethrough into the internal volume defined by the housing 114. The reductant port 156 may be positioned upstream of the SCR system 150 (e.g., to allow reductant to be inserted into the exhaust gas upstream of the SCR system 150) or over the SCR system 150 (e.g., to allow reductant to be inserted directly on the SCR system 150). Mixers, baffles, vanes or other structures may be positioned in the housing 114 upstream of the SCR system 150 (e.g., between the filter 140 and the SCR system 150) so as to facilitate mixing of the reductant with the exhaust gas.

The aftertreatment system 100 may include a reductant storage tank 110 (e.g., container, reservoir, etc.) that is structured to store a reductant. The reductant is formulated to facilitate decomposition of the constituents of the exhaust gas (e.g., $NO_x$ gases included in the exhaust gas). Any suitable reductant may be used. In some embodiments, the exhaust gas comprises a diesel exhaust gas and the reductant comprises a diesel exhaust fluid (DEF). For example, the DEF may comprise urea, an aqueous solution of urea, or any other fluid that comprises ammonia, by-products, or any other diesel exhaust fluid as is known in the arts (e.g., the DEF marketed under the name ADBLUE®). For example, the reductant may comprise an aqueous urea solution having a particular ratio of urea to water. In some embodiments, the reductant can comprise an aqueous urea solution including 32.5% by weight of urea and 67.5% by weight of deionized water, including 40% by weight of urea and 60% by weight of deionized water, or any other suitable ratio of urea to deionized water.

The aftertreatment system 100 may include a reductant insertion assembly 120 that is fluidly coupled to the reductant storage tank 110. The reductant insertion assembly 120 is configured to selectively insert the reductant into the SCR system 150 or upstream thereof, or upstream or into a mixer (not shown) positioned upstream of the SCR system 150. The reductant insertion assembly 120 may comprise various structures to facilitate receipt of the reductant from the reductant storage tank 110 and delivery to the SCR system 150, for example, pumps, valves, screens, filters, etc.

The aftertreatment system 100 may include a reductant injector that is fluidly coupled to the reductant insertion assembly 120 and configured to insert the reductant (e.g., a combined flow of reductant and compressed air) into the SCR system 150. In some embodiments, the reductant injector may include a nozzle having a predetermined diameter. In some embodiments, the reductant injector may be positioned in the reductant port 156 and structured to deliver a stream or a jet of the reductant into the internal volume of the housing 114 so as to deliver the reductant to the SCR system 150.

The controller 160 may be operatively coupled to the first temperature sensor 103, the second temperature sensor 105, the gas sensor 112, the heater 108, and in some embodiments, the reductant insertion assembly 120, the hydrocarbon insertion assembly 122, and/or the outlet sensor 107. For example, the controller 160 may be configured to receive an upstream exhaust gas temperature signal from the first temperature sensor 103 and receive a downstream exhaust gas temperature signal from the second temperature sensor 105 to determine the upstream exhaust gas temperature and the downstream exhaust gas temperature, respectively. The controller 160 is configured to determine the upstream exhaust gas temperature upstream of the heater 108, for example, based on the exhaust gas temperature signal received from the first temperature sensor 103. The upstream exhaust gas temperature corresponds to the temperature of the exhaust gas entering the aftertreatment system 100. The controller 160 may also be configured to determine the downstream exhaust gas temperature downstream of the heater 108, for example, based on a signal received from the second temperature sensor 105.

The controller 160 may be operably coupled to the engine 101, the first temperature sensor 103, the second temperature sensor 105, the heater 108, the gas sensor 112, the outlet sensor 107, the reductant insertion assembly 120, the hydrocarbon insertion assembly 122, and/or various components of the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. In some embodiments, the controller 160 includes various circuitries or modules configured to perform the operations of the controller 160 described herein.

Using Virtual Sensors for Detecting Conditions

Biodiesel virtual sensors can be used to detect conditions. For example, the biodiesel virtual sensors can be used for estimating biodiesel blend, determining tampering status of a physical sensor, updating a lower heating value for dosing calibration, and/or adjusting the physical sensor.

Figure 2:
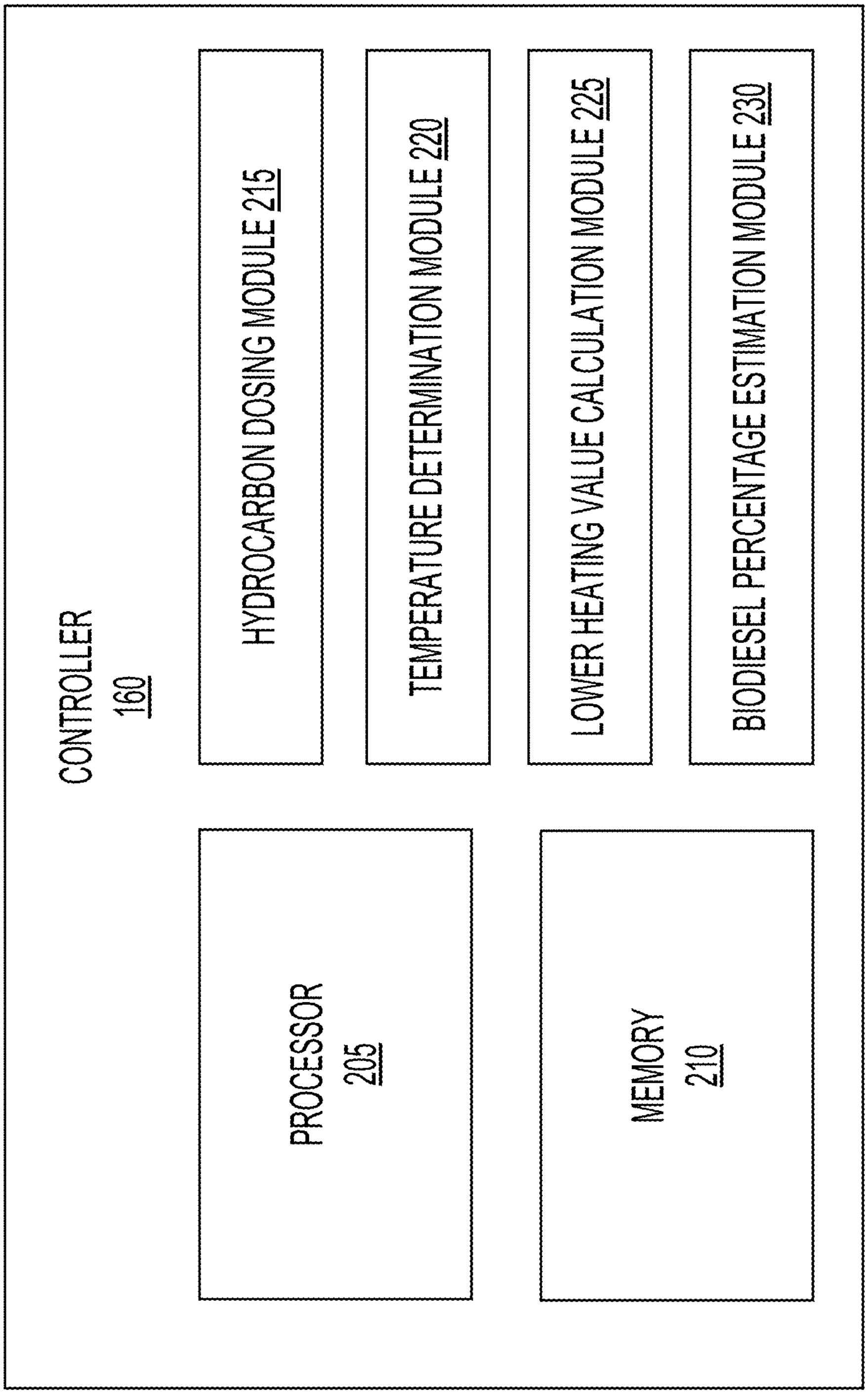
FIG. 2 illustrates a block diagram of a controller of the aftertreatment system of FIG. 1, according to an example implementation.

FIG. 2 illustrates a block diagram of the controller 160. The controller 160 may be configured to estimate a percentage (e.g., blend) of biodiesel in the fuel based on the LHV to determine if a fuel quality sensor that may be present in the aftertreatment system 100 has been tampered with and/or for updating the LHV for hydrocarbon dosing calibration for use in regenerating the filter 140, cleaning out deposits in the aftertreatment system 100, and/or desulfurization.

A non-transitory computer-readable media can include computer-readable instructions stored thereon that, when executed by at least one controller 160, cause the at least one controller 160 to control an amount of hydrocarbons provided upstream of the DOC. The instructions can cause the at least one controller 160 to determine a first temperature of exhaust gas at an inlet of the DOC. The exhaust gas can be produced from combustion of fuel. The instructions can cause the at least one controller 160 to determine a second temperature of the exhaust gas at an outlet of the DOC. The instructions can cause the at least one controller 160 to calculate an LHV of the fuel based on the first temperature, the second temperature, the amount of hydrocarbons, and a flow rate of the exhaust gas. The instructions can cause the at least one controller 160 to estimate a percentage of biodiesel in the fuel based on the LHV.

The controller 160 can output an indication of the estimated percentage of biodiesel in the fuel. The controller 160 can determine that the first temperature is greater than or equal to a light-off temperature of the DOC prior to controlling the amount of hydrocarbons provided upstream the DOC. The controller 160 can determine a difference between the second temperature and the first temperature to calculate the LHV. The controller 160 can output an indication of the tampering status. The controller 160 can determine a weighted percentage of biodiesel in the fuel based on the percentage of biodiesel in the fuel based on the LHV and the percentage of biodiesel in the fuel measured by the physical sensor. The controller 160 can determine an average of the percentage of biodiesel in the fuel based on the LHV and the percentage of biodiesel in the fuel measured by the physical sensor. The controller 160 can estimate the percentage of biodiesel in the fuel based at least one of a density of the fuel, a dynamic viscosity of the fuel, a dielectric constant of the fuel, or a resistivity of the fuel. The density of the fuel, the dynamic viscosity of the fuel, the dielectric constant of the fuel, and/or the resistivity of the fuel can be measured by one or more sensors. The density of the fuel, the dynamic viscosity of the fuel, the dielectric constant of the fuel, or the resistivity of the fuel can be used by the controller 160 independently of the physical sensor. The LHV and at least one of the density of the fuel, the dynamic viscosity of the fuel, the dielectric constant of the fuel, or the resistivity of the fuel can be used to determine the percentage of biodiesel in the fuel. The LHV and at least one of the density of the fuel, the dynamic viscosity of the fuel, the dielectric constant of the fuel, or the resistivity of the fuel can be used in one or more machine learning models or algorithms to determine the percentage of biodiesel in the fuel. The controller 160 can estimate the percentage of biodiesel in the fuel using one or more outputs of the physical sensor. The controller 160 can estimate a percentage of hydrotreated vegetable oil (HVO) in the fuel based on the LHV.

The controller 160 can control a first injection of hydrocarbons prior to calculating the LHV. The controller 160 can control a second injection of hydrocarbons based on the calculated LHV. The controller 160 can control the first temperature, the amount of hydrocarbons that are injected, and the flow rate of the exhaust gas to achieve the second temperature of less than 450° C. The controller 160 can initiate an injection event. The injection event can include injection of hydrocarbons upstream of the DOC. The injection event can occur over a period of time of less than a threshold time. The threshold time can be five minutes. The flow rate of the exhaust gas can be determined based on one or more engine operating conditions.

The controller 160 can compare the percentage of biodiesel in the fuel based on the LHV with a percentage of biodiesel in the fuel measured by a physical sensor. The controller 160 can determine a tampering status of the physical sensor responsive to a determination that a difference between the percentage of biodiesel in the fuel based on the LHV and the percentage of biodiesel in the fuel measured by the physical sensor is greater than a threshold value.

The controller 160 may include a processor 205 configured to execute computer-readable instructions stored in a computer-readable memory 210. The processor 205 may be implemented in hardware, firmware, software, or any combination thereof. The processor 205 may retrieve instruction(s) from the memory 210 for execution. The memory 210 may be any of a variety of memories that may be suitable for use with the controller 160. For example, in some embodiments, the memory 210 may include Static Random Access Memory (SRAM), Dynamic Random Access Memory (DRAM), Magnetoresistive Random Access Memory (MRAM), Phase Control Memory (PCM), Resistive Random Access Memory (ReRAM), 3D XPoint memory, ferroelectric random-access memory (FeRAM), flash memory, hard disk drive memory, floppy disk memory, magnetic tape memory, optical disk memory, and/or other types of volatile, non-volatile, and semi-volatile memories that may be considered suitable.

The controller 160 may also include a hydrocarbon dosing module 215, a temperature determination module 220, a lower heating value calculation (LHV) module 225, and a biodiesel percentage estimation module 230. Although the hydrocarbon dosing module 215, the temperature determination module 220, the lower heating value calculation module 225, and the biodiesel percentage estimation module 230 are shown as separate components of the controller 160, in some embodiments, at least some of those modules may be integrated together and the integrated module may perform the functions of the individual modules that have been integrated. Further, although not shown, in some embodiments, one or more of the hydrocarbon dosing module 215, the temperature determination module 220, the lower heating value calculation module 225, and the biodiesel percentage estimation module 230 may have respective processing unit(s) and memory unit(s) to perform their respective functions, as described herein. In other embodiments, one or more of the hydrocarbon dosing module 215, the temperature determination module 220, the lower heating value calculation module 225, and the biodiesel percentage estimation module 230 may use the processor 205 and the memory 210.

The hydrocarbon dosing module 215 may be configured to dose hydrocarbons into the aftertreatment system 100. The hydrocarbon dosing module 215 can control dosing of hydrocarbons by the hydrocarbon insertion assembly 122. The hydrocarbon dosing module 215 can receive an indication that the temperature of the DOC is greater than the light-off temperature of the DOC. The hydrocarbon dosing module 215 can determine a time period over which a dosing event (e.g., injection event) occurs (e.g., injection of fuel, hydrocarbons). The hydrocarbon dosing module 215 can initiate an injection event. The hydrocarbon dosing module 215 can control an amount of hydrocarbons provided upstream of the DOC.

The temperature determination module 220 may be configured to determine a first temperature of exhaust gas at an inlet of the DOC. The exhaust gas can be produced from combustion of fuel. The first temperature of the exhaust gas at the inlet of the DOC can be determined by the at least one controller 160. The exhaust gas can be produced from combustion of fuel. The first temperature can be determined using one or more sensors (e.g., thermistors). The sensor can be coupled with the inlet of the DOC. For example, the sensor can be disposed at the inlet of the DOC to measure the temperature of the exhaust gas at the inlet of the DOC. The first temperature can be a variable in the calculation of the LHV. The first temperature of the exhaust gas can include a temperature of the inlet of the DOC (e.g., DOC inlet temperature). The first temperature of the exhaust gas can be measured by a first sensor (e.g., DOC inlet sensor). The first sensor can be coupled to the inlet of the DOC. For example, the first sensor can be disposed at an inlet of the DOC. The first sensor can measure the temperature of the exhaust gas at the inlet of the DOC.

The temperature determination module 220 may be configured to determine a second temperature of the exhaust gas at an outlet of the DOC. The second temperature of the exhaust gas at the outlet of the DOC can be determined by the at least one controller 160. The second temperature can be determined using one or more sensors (e.g., thermistors). The sensor can be coupled with the outlet of the DOC. For example, the sensor can be disposed at the outlet of the DOC to measure the temperature of the exhaust gas at the outlet of the DOC. The second temperature can be a variable in the calculation of the LHV. The second temperature of the exhaust gas can include a temperature of the outlet of the DOC (e.g., DOC outlet temperature). A temperature difference between the exhaust gas at the outlet of the DOC and at the inlet of the DOC can be used to calculate the LHV. The second temperature of the exhaust gas can be measured by a second sensor (e.g., DOC outlet sensor, outlet sensor 107). The second sensor can be coupled to the outlet of the DOC. For example, the second sensor can be disposed at an outlet of the DOC. The second sensor can measure the temperature of the exhaust gas at the outlet of the DOC.

The LHV calculation module 225 may be configured to calculate an LHV of the fuel based on the first temperature, the second temperature, the amount of hydrocarbons (e.g., amount of hydrocarbons injected or provided upstream of the DOC), and a flow rate of the exhaust gas. The LHV of the fuel can be calculated by the at least one controller 160. The flow rate of the exhaust gas can be a variable in the calculation of the LHV. The flow rate of the exhaust gas can be determined based on one or more engine operating conditions. For example, the flow rate of the exhaust gas can be calculated using an equation that relates the flow rate of the exhaust gas to the one or more engine operation conditions. The flow rate can be estimated based one the one or more engine operating conditions. The relationship between the flow rate and the engine operating conditions can be defined by an equation. The engine operating conditions can include, for example, the speed of the engine, the torque of the engine, the charge flow through the engine, ambient air temperature, fueling quantities, and/or the turbocharger speed. The LHV may not be directly measured by the one or more sensors of the aftertreatment system 100, and therefore can be calculated based on one or more of the first temperature, the second temperature, the amount of hydrocarbons, and the flow rate of the exhaust gas.

Data related to the first temperature, the second temperature, the amount of hydrocarbons, and a flow rate of the exhaust gas can be collected over a time interval. This data can include first temperature data, second temperature data, amount of hydrocarbons data, and flow rate of the exhaust gas data. The time interval can be in a range of 30 second to 20 minutes. For example, the time interval can be in a range of 30 seconds to 1 minute, 30 seconds to 2 minutes, 30 seconds to 3 minutes, 30 seconds to 4 minutes, 30 seconds to 5 minutes, 30 seconds to 10 minutes, 30 seconds to 30 minutes, 1 minute to 2 minutes, 1 minute to 3 minutes, 1 minute to 4 minutes, 1 minute to 5 minutes, 1 minute to 10 minutes, 1 minute to 20 minutes, 2 minutes to 3 minutes, 2 minutes to 4 minutes, 2 minutes to 5 minutes, 2 minutes to 10 minutes, 2 minutes to 20 minutes, 3 minutes to 4 minutes, 3 minutes to 5 minutes, 3 minutes to 10 minutes, 3 minutes to 20 minutes, 4 minutes to 5 minutes, 4 minutes to 10 minutes, 4 minutes to 20 minutes, 5 minutes to 10 minutes, 5 minutes to 20 minutes, or 10 minutes to 20 minutes. The data can be a real-time stream of data. For example, the first sensor can collect first temperature data. The first temperature can fluctuate over the time interval. The flow rate of the exhaust gas can fluctuate over the time interval. The amount of hydrocarbons can fluctuate over the time interval. Therefore, the data may need to be filtered to obtained filtered data. The filtered data can be used to calculate the LHV. For example, the filtered data can be used as an input to calculate the LHV.

The biodiesel percentage estimation module 230 may be configured to estimate a percentage of biodiesel in the fuel based on the LHV. The percentage of biodiesel in the fuel can be estimated by the at least one controller 160. The percentage of biodiesel in the fuel can be estimated by correlating the LHV to a percentage of biodiesel. The correlation can be performed using, for example, interpolation of measured data, lookup tables, simulated data, equations, or algorithms. The correlation can be tailored to specific kinds or types of biodiesel sources. The correlation can be tailored to specific regions of the same biodiesel type. The correlation can be based on one or more prediction models for estimating biodiesel fraction based on LHV. The percentage of biodiesel in the fuel can be estimated after fueling a vehicle, instead of after implementation of one or more protocols, such as regenerating the filter 140, cleaning out deposits in the aftertreatment system 100, and/or desulfurization. The estimation can occur after the vehicle has been refueled.

Figure 3:
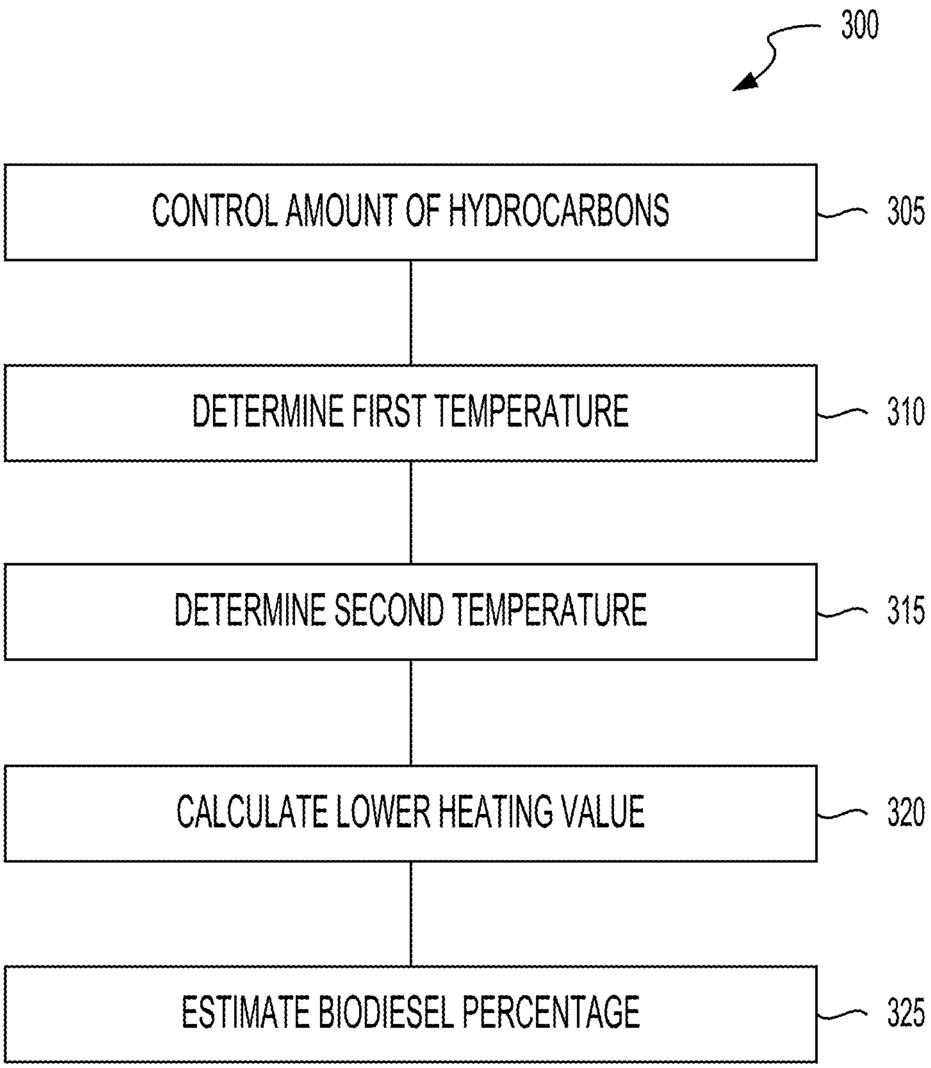
FIG. 3 illustrates a method to estimate biodiesel blend in fuel of an aftertreatment system, according to an example implementation.

FIG. 3 illustrates an example method 300 to estimate biodiesel blend (e.g., biodiesel percentage, biodiesel fraction, biodiesel quality) in fuel. The method 300 can be implemented by any of various systems and devices described herein, including but not limited to the aftertreatment system 100 and/or the controller 160 (e.g., processor) described with reference to FIGS. 1 and 2. The method 300 can be implemented in any of various modalities, including but not limited to real-time techniques in which one or more aspects of the method 300 are executed responsive to real-time sensor data detected regarding inlet DOC and outlet DOC temperatures, amount of hydrocarbons, and exhaust gas flow rate.

The method 300 can include estimation of biodiesel blend using a virtual sensor (e.g., biodiesel virtual sensor) without needing a physical sensor that measures fuel quality. Instead, the virtual sensor can use a proxy for fuel quality (e.g., lower heating value) to estimate the percentage of biodiesel in the fuel. The LHV for biodiesel can be different from the LHV of petroleum-based diesel (e.g., petroleum-derived diesel) and/or hydrotreated vegetable oil (HVO). The method 300 can be performed, for example, using a separate hydrocarbon dosing event from that used for calibrating and/or regenerating the aftertreatment system 100 (e.g., filter regeneration, deposit cleanout, and/or desulfurization). The hydrocarbon dosing event used to calculate the LHV and estimate the percentage of biodiesel can be a shorter dosing event compared to that used for calibrating and/or regenerating the aftertreatment system 100. The method 300 can support or oppose a value for the percentage of biodiesel in the fuel measured by the physical sensor (e.g., fuel quality sensor). This can increase or decrease the confidence of using the physical sensor for measuring fuel quality. The method 300 can dose fuel (e.g., hydrocarbons) across the DOC specifically for determining the biodiesel quantity. In some embodiments, the method 300 can be performed, for example, using the same hydrocarbon dosing event as that used for calibrating and/or regenerating the aftertreatment system 100. In some embodiments, the method 300 can replace the physical sensor such that the aftertreatment system 100 does not a physical sensor for specifically measuring fuel quality.

Thus, the method 300 includes controlling an amount of hydrocarbons provided upstream of a DOC (305). The method 300 can include determining a first temperature of exhaust gas at an inlet of the DOC (310). The method 300 can include determining a second temperature of the exhaust gas at an outlet of the DOC (315). The method 300 can include calculating an LHV of the fuel (320). The method 300 can include estimating a percentage of biodiesel in the fuel based on the LHV (325).

Referring to FIG. 3 in further detail, the method 300 can include controlling an amount of hydrocarbons provided upstream of a DOC (305). The amount of hydrocarbons can be controlled by the at least one controller 160. The hydrocarbons can be provided to an aftertreatment system 100. For example, the hydrocarbons can be provided to the engine 101 of the aftertreatment system 100. The hydrocarbons can be provided to an inlet of the DOC. The amount of hydrocarbons can include a quantity of fuel (e.g., injection quantity of fuel). The amount of hydrocarbons can include a quantity of hydrocarbons (e.g., quantity of hydrocarbons that is injected). The amount of hydrocarbons can be controlled by controlling an injection of hydrocarbons by a hydrocarbon insertion assembly 122. The injection of hydrocarbons can include a first injection of hydrocarbons. The injection of hydrocarbons can include a hydrocarbon dosing event. The hydrocarbon dosing event used for calculating the LHV can be a separate dosing event from that used for regenerating the filter 140, cleaning out deposits in the aftertreatment system 100, and/or desulfurization. The amount of hydrocarbons can be controlled by controlling the amount of hydrocarbons provided to the engine. For example, the amount of hydrocarbons can be provided to the engine by increasing the amount of fuel provided to the engine (e.g., as opposed to a dosing event). The amount of hydrocarbons can be a variable in the calculation of the LHV. The amount of hydrocarbons can be a rate of hydrocarbons injected by the hydrocarbon insertion assembly 122. The amount of hydrocarbons can be a rate of hydrocarbons provided upstream of the DOC. The amount of hydrocarbons can have units of g/s. The DOC can be located downstream of the hydrocarbon insertion assembly 122. The hydrocarbon insertion assembly 122 can be located upstream of the DOC. The hydrocarbon insertion assembly 122 can be coupled with the at least one controller 160. For example, the at hydrocarbon insertion assembly 122 can be electrically coupled with the at least one controller 160. The at least one controller 160 can control injection of hydrocarbons by or through the hydrocarbon insertion assembly 122.

The method 300 includes determining a first temperature of exhaust gas at an inlet of the DOC (310). The first temperature of the exhaust gas at the inlet of the DOC can be determined by the at least one controller 160. The exhaust gas can be produced from combustion of fuel. The first temperature can be determined using one or more sensors (e.g., thermistors). The sensor can be coupled with the inlet of the DOC. For example, the sensor can be disposed at the inlet of the DOC to measure the temperature of the exhaust gas at the inlet of the DOC. The first temperature can be a variable in the calculation of the LHV. The first temperature of the exhaust gas can include a temperature of the inlet of the DOC (e.g., DOC inlet temperature). The first temperature of the exhaust gas can be measured by a first sensor (e.g., DOC inlet sensor). The first sensor can be coupled to the inlet of the DOC. For example, the first sensor can be disposed at an inlet of the DOC. The first sensor can measure the temperature of the exhaust gas at the inlet of the DOC.

The method 300 includes determining a second temperature of the exhaust gas at an outlet of the DOC (315). The second temperature of the exhaust gas at the outlet of the DOC can be determined by the at least one controller 160. The second temperature can be determined using one or more sensors (e.g., thermistors). The sensor can be coupled with the outlet of the DOC. For example, the sensor can be disposed at the outlet of the DOC to measure the temperature of the exhaust gas at the outlet of the DOC. The second temperature can be a variable in the calculation of the LHV. The second temperature of the exhaust gas can include a temperature of the outlet of the DOC (e.g., DOC outlet temperature). A temperature difference between the exhaust gas at the outlet of the DOC and at the inlet of the DOC can be used to calculate the LHV. The second temperature of the exhaust gas can be measured by a second sensor (e.g., DOC outlet sensor). The second sensor can be coupled to the outlet of the DOC. For example, the second sensor can be disposed at an outlet of the DOC. The second sensor can measure the temperature of the exhaust gas at the outlet of the DOC.

The method 300 includes calculating an LHV of the fuel (320). The LHV of the fuel can be calculated by the at least one controller 160. The LHV of the fuel can be calculated based on one or more of the first temperature, the second temperature, the amount of hydrocarbons, and a flow rate of the exhaust gas. The flow rate of the exhaust gas can be a variable in the calculation of the LHV. The flow rate of the exhaust gas can be determined based on one or more engine operating conditions. The engine operating conditions can include, for example, the speed of the engine, the torque of the engine, the charge flow through the engine, ambient air temperature, fueling quantities, and/or the turbocharger speed. The LHV may not be directly measured by the one or more sensors of the aftertreatment system 100, and therefore can be calculated based on one or more of the first temperature, the second temperature, the amount of hydrocarbons, and the flow rate of the exhaust gas.

Data related to the first temperature, the second temperature, the amount of hydrocarbons, and a flow rate of the exhaust gas can be collected over a time interval. This data can include first temperature data, second temperature data, amount of hydrocarbons data, and flow rate of the exhaust gas data. The time interval can be in a range of 30 second to 20 minutes. For example, the time interval can be in a range of 30 seconds to 1 minute, 30 seconds to 2 minutes, 30 seconds to 3 minutes, 30 seconds to 4 minutes, 30 seconds to 5 minutes, 30 seconds to 10 minutes, 30 seconds to 30 minutes, 1 minute to 2 minutes, 1 minute to 3 minutes, 1 minute to 4 minutes, 1 minute to 5 minutes, 1 minute to 10 minutes, 1 minute to 20 minutes, 2 minutes to 3 minutes, 2 minutes to 4 minutes, 2 minutes to 5 minutes, 2 minutes to 10 minutes, 2 minutes to 20 minutes, 3 minutes to 4 minutes, 3 minutes to 5 minutes, 3 minutes to 10 minutes, 3 minutes to 20 minutes, 4 minutes to 5 minutes, 4 minutes to 10 minutes, 4 minutes to 20 minutes, 5 minutes to 10 minutes, 5 minutes to 20 minutes, or 10 minutes to 20 minutes. The data can be a real-time stream of data. For example, the first sensor can collect first temperature data. The first temperature can fluctuate over the time interval. The flow rate of the exhaust gas can fluctuate over the time interval. The amount of hydrocarbons can fluctuate over the time interval. Therefore, the data may need to be filtered to obtained filtered data. The filtered data can be used to calculate the LHV. For example, the filtered data can be used as an input to calculate the LHV.

The method 300 includes determining a difference between the second temperature and the first temperature. For example, the difference between the second temperature and the first temperature can include the difference between the temperature of the exhaust gas at the DOC outlet and the temperature of the exhaust gas at the DOC inlet.

In some embodiments, the LHV can be calculated using Equation 1:

$$LHV = \frac{(\dot{m}_{ex} + \dot{m}_{dose}) \times C_{p,ex,out} \times (T_{out} + 273) - C_{p,ex,in} \times (T_{in} + 273))}{\dot{m}_{dose} \times \eta_{th}} \times 100 \quad \text{Eq. 1}$$

where $T_{in}$ is the temperature of the exhaust gas at the DOC inlet (e.g., first temperature), $T_{out}$ is the temperature of the exhaust gas at the DOC outlet (e.g., second temperature), $C_{p,ex,in}$ is the coefficient of heat of exhaust gas at the exhaust temperature at the DOC inlet, $C_{p,ex,out}$ is the coefficient of heat of exhaust gas at the exhaust temperature at the DOC outlet, $\dot{m}_{ex}$ is the mass flow rate (e.g., mass flux, mass current) of the exhaust gas, $\dot{m}_{dose}$ is the mass flow rate of hydrocarbons, and $\eta_{th}$ is the thermal efficiency.

In some embodiments, the LHV can be calculated using Equation 2:

$$LHV = \frac{(\dot{m}_{exhaust} + \dot{m}_{HC\ Injection}) \times C_{p,exhaust} \times (T_{DOC\ Out} - T_{DOC\ In})}{\dot{m}_{HC\ Injection}} \quad \text{Eq. 2}$$

where $\dot{m}_{exhaust}$ is the mass flow rate of the exhaust gas, $\dot{m}_{HC\ Injection}$ is the mass flow rate of hydrocarbons (e.g., injected hydrocarbons), $C_{p,exhaust}$ is the specific heat capacity of the exhaust gas, $T_{DOC\ In}$ is the temperature of the exhaust gas at the DOC inlet (e.g., first temperature), and $T_{DOC\ Out}$ is the temperature of the exhaust gas at the DOC outlet (e.g., second temperature). Equation 2 can assume 100% thermal efficiency.

The at least one controller 160 can control the first temperature, the amount of hydrocarbons that are injected, and the flow rate of the exhaust gas to achieve a target temperature for the second temperature. For example, the target temperature can be less than 500° C. (e.g., less than 475° C., less than 450° C., less than 425° C., less than 400° C., less than 300° C.). The target temperature for the second temperature can be less than the temperature used for protocols such as regenerating the filter 140, cleaning out deposits in the aftertreatment system 100, and/or desulfurization. These protocols (e.g., regenerating the filter 140, cleaning out deposits in the aftertreatment system 100, and/or desulfurization) can occur at temperatures above 500° C. Therefore, the method 300 can operate at a lower temperature than these protocols. The first temperature can be about 300° C.

The method 300 includes estimating a percentage of biodiesel in the fuel based on the LHV (325). The percentage of biodiesel in the fuel can be estimated by the at least one controller 160. The percentage of biodiesel in the fuel can be estimated by correlating the LHV to a percentage of biodiesel. The correlation can be performed using, for example, interpolation of measured data, lookup tables, simulated data, equations, or algorithms. For example, interpolation of measured data can include constructing new data points based on a range of a discrete set of measured data corresponding to the lower heating values of various biodiesel blends. Lookup tables can include an array that replaces runtime computation with an array that indexes the lower heating values with various biodiesel blends. Simulated data can be data obtained from computation calculations of lower heating values for various biodiesel blends. Equations can include mathematical formulae defining the relationship between lower heating values and various biodiesel blends. Algorithms can include a sequence of operations to calculate lower heating values for various biodiesel blends. The correlation can be tailored to specific kinds or types of biodiesel sources (e.g., rapeseed oil biodiesel, corn oil biodiesel, soybean oil, waste oil biodiesel). The correlation can be tailored to specific regions of the same biodiesel type (e.g., corn oil biodiesel from a farm in Indiana vs. corn oil from a farm in France). The correlation can be based on one or more prediction models for estimating biodiesel fraction based on LHV. The percentage of biodiesel in the fuel can be estimated after fueling a vehicle (e.g., truck), instead of after implementation of one or more protocols, such as regenerating the filter 140, cleaning out deposits in the aftertreatment system 100, and/or desulfurization. The estimation can occur after the vehicle has been refueled.

The method 300 includes outputting an indication of the estimated percentage of biodiesel in the fuel. The indication of the estimated percentage of biodiesel in the fuel can be output by the at least one controller 160. For example, the indication of the estimated percentage of biodiesel in the fuel can be displayed on an interface (e.g., display interface, user interface). The indication can include at least one of a light, a message, a sound, a beep, an alert, a text, or an email. The indication of the estimated percentage of biodiesel in the fuel can include a numerical value.

The method 300 includes initiating an injection event (e.g., injection, first injection). Initiating the injection event can occur responsive to determining the first temperature and determining the second temperature. The injection event can include injection of hydrocarbons upstream of the DOC. The injection event can be initiated by the at least one controller 160. The injection event can include injection of hydrocarbons to the DOC. The injection event can occur responsive to a determination that the temperature of the DOC (e.g., first temperature, second temperature) is greater than the temperature of the DOC. The light-off temperature of the DOC can include a temperature at which the DOC will catalyze combustion of the hydrocarbons (e.g., burn fuel). The injection event can occur over a period of time. For example, the period of time can be less than or equal to five minutes. The time period can be more than five minutes. The period of time can be a time range. The period of time can be shorter than a period of time used for protocols such as regenerating the filter 140, cleaning out deposits in the aftertreatment system 100, and/or desulfurization. Therefore, the method 300 can operate for a shorter period of time than these protocols. The period of time can be optimized for hydrocarbon oxidation. The injection event can occur over a period of time of less than a threshold time. The threshold time can be, for example, 30 seconds, 1 minute, 2 minutes, 3 minutes, 4 minutes, 5 minutes, 10 minutes, 20 minutes, or 30 minutes.

The first injection (e.g., first injection of hydrocarbons) can be controlled prior to calculating the LHV. The first injection can include an injection of hydrocarbons during the step of controlling the amount of hydrocarbons. For example, the first injection can be initiated prior to calculating the LHV. The at least one controller 160 can control the first injection of hydrocarbons prior to calculating the LHV. A second injection (e.g., second injection of hydrocarbons) can be controlled after calculating the LHV. For example, the second injection can be initiated after calculating the LHV. The at least one controller 160 can control the second injection of hydrocarbons based on the calculated LHV. The at least one controller 160 can calibrate the hydrocarbon insertion assembly 122 based on the calculated lower heating value to control the second injection of hydrocarbons. For example, the at least one controller 160 can calibrate the hydrocarbon insertion assembly 122 by adjusting the amount of hydrocarbons in the second injection. The hydrocarbons in the first injection can be different from the hydrocarbons in the second injection.

The method 300 includes comparing the percentage of biodiesel in the fuel based on the LHV with the percentage of biodiesel in the fuel measured by a physical sensor. The percentage of biodiesel in the fuel based on the LHV and the percentage of biodiesel in the fuel measured by the physical sensor can be compared by the at least one controller 160. The percentage of biodiesel in the fuel based on the LHV can include an estimated percentage of biodiesel in the fuel. The percentage of biodiesel in the fuel based on the LHV can be compared to the percentage of biodiesel in the fuel measured by the physical sensor by subtracting the value for the percentage of biodiesel in the fuel based on the LHV from the value for the percentage of biodiesel in the fuel measured by the physical sensor. The percentage of biodiesel in the fuel based on the LHV can be compared to the percentage of biodiesel in the fuel measured by the physical sensor by subtracting the value for the percentage of biodiesel in the fuel measured by the physical sensor from the value for the percentage of biodiesel in the fuel based on the LHV.

The method 300 includes determining a tampering status of the physical sensor responsive to a determination that a difference between the percentage of biodiesel in the fuel based on the LHV and the percentage of biodiesel in the fuel measured by the physical sensor is greater than a threshold value. The tampering status of the physical sensor can be determined by the at least one controller 160. The tampering status can be output as an indication that the physical sensor has undergone tampering. The tampering status of the physical sensor can be defined as whether or not the physical sensor has been tampered with. For example, the physical sensor can be used to sense fuel (e.g., secondary fuel) that is not the same fuel as the fuel (e.g., primary fuel, actual fuel) used to run the engine. In this case, the physical sensor can output the percentage of biodiesel for the secondary fuel while the percentage of biodiesel based on the LHV is estimated for the primary fuel. Since one of the purposes of the physical sensor can be to measure the fuel quality of the fuel used to run the engine, if the percentage of biodiesel in the fuel based on the LHV is different from the percentage of biodiesel measured by the physical sensor, this may be an indication that the physical sensor and/or the aftertreatment system 100 has been tampered with. There may be a difference between the percentage of biodiesel in the fuel measured by the physical sensor and the percentage of biodiesel in the fuel based on the LHV due to error in one or more of the physical sensor measurements or LHV calculation. Therefore, the threshold value can be used to filter out or guard against differences due to error in one or more of the physical sensor measurements or LHV calculation.

Responsive to the determination that the difference between the percentage of biodiesel in the fuel based on the LHV and the percentage of biodiesel in the fuel measured by the physical sensor is greater than the threshold value, the at least one controller 160 can determine that the physical sensor and/or the aftertreatment system 100 has been tampered with (e.g., the physical sensor is measuring the percentage of biodiesel in the secondary fuel and the percentage of biodiesel in the fuel based on the LHV is estimated for the primary fuel). For example, tampering (e.g., tampering of the physical sensor) can be defined as a scenario in which the physical sensor is not measuring the percentage of biodiesel of the fuel in the engine 101. Responsive to the determination that the difference between the percentage of biodiesel in the fuel based on the LHV and the percentage of biodiesel in the fuel measured by the physical sensor is less than the threshold value, the at least one controller 160 can determine that the physical sensor and/or the aftertreatment system 100 has not been tampered with (e.g., the physical sensor is measuring the percentage of biodiesel in the primary fuel and the percentage of biodiesel in the fuel based on the LHV is estimated for the primary fuel).

The method 300 includes outputting an indication of the tampering status. The indication of the tampering status can be output by the at least one controller 160. For example, the indication of the tampering status can be displayed on an interface (e.g., display interface, user interface). The indication can include at least one of a light, a message, a sound, a beep, an alert, a text, or an email.

The method 300 includes determining that the first temperature is greater than or equal to the light-off temperature of the DOC. The first temperature can be determined to be greater than or equal to the light-off temperature of the DOC by the at least one controller 160. Determining that the first temperature is greater than or equal to a light-off temperature of the DOC can occur prior to controlling the amount of hydrocarbons provided upstream of the DOC. The DOC can be sufficiently heated (e.g., equal to or greater than the light-off temperature) prior to controlling the amount of hydrocarbons provided upstream of the DOC. The method 300 can include determining that the temperature of the DOC is greater than or equal to the light-off temperature of the DOC. The method 300 can include determining that the second temperature is greater than or equal to the light-off temperature of the DOC.

The method 300 includes estimating the percentage of biodiesel in the fuel based on at least one of a density of the fuel, a dynamic viscosity of the fuel, a dielectric constant of the fuel, or a resistivity of the fuel. The percentage of biodiesel in the fuel can be estimated by the at least one controller 160. The density of the fuel, the dynamic viscosity of the fuel, the dielectric constant of the fuel, or the resistivity of the fuel can be used by the controller 160 independently of the physical sensor.

The method 300 includes determining a weighted percentage of biodiesel in the fuel based on the percentage of biodiesel in the fuel based on the LHV and the percentage of biodiesel in the fuel measured by the physical sensor. The weighted percentage of biodiesel in the fuel can be determined by the at least one controller 160. For example, the percentage of biodiesel in the fuel based on the LHV may be given more weight than the percentage of biodiesel in the fuel measured by the physical sensor. The weighted percentage can include contributions from the percentage of biodiesel in the fuel based on the LHV and the percentage of biodiesel in the fuel measured by the physical sensor. For example, the percentage of biodiesel in the fuel based on the LHV can be given a weight of 60% and the percentage of biodiesel in the fuel measured by the physical sensor can be given a weight of 40%. In this case, the weighted percentage of biodiesel in the fuel would equal the sum of the percentage of biodiesel in the fuel based on the LHV×60%+the percentage of biodiesel in the fuel measured by the physical sensor×40%.

The method 300 includes determining an average of the percentage of biodiesel in the fuel based on the LHV and the percentage of biodiesel in the fuel measured by the physical sensor. The average of the percentage (e.g., average percentage) of biodiesel in the fuel can be determined by the at least one controller 160. The average percentage can include contributions from the percentage of biodiesel in the fuel based on the LHV and the percentage of biodiesel in the fuel measured by the physical sensor. For example, the percentage of biodiesel in the fuel based on the LHV can be averaged with the percentage of biodiesel in the fuel measured by the physical sensor. In this case, the average percentage of biodiesel in the fuel would equal one half of the sum of the percentage of biodiesel in the fuel based on the LHV and the percentage of biodiesel in the fuel measured by the physical sensor.

Figure 4:
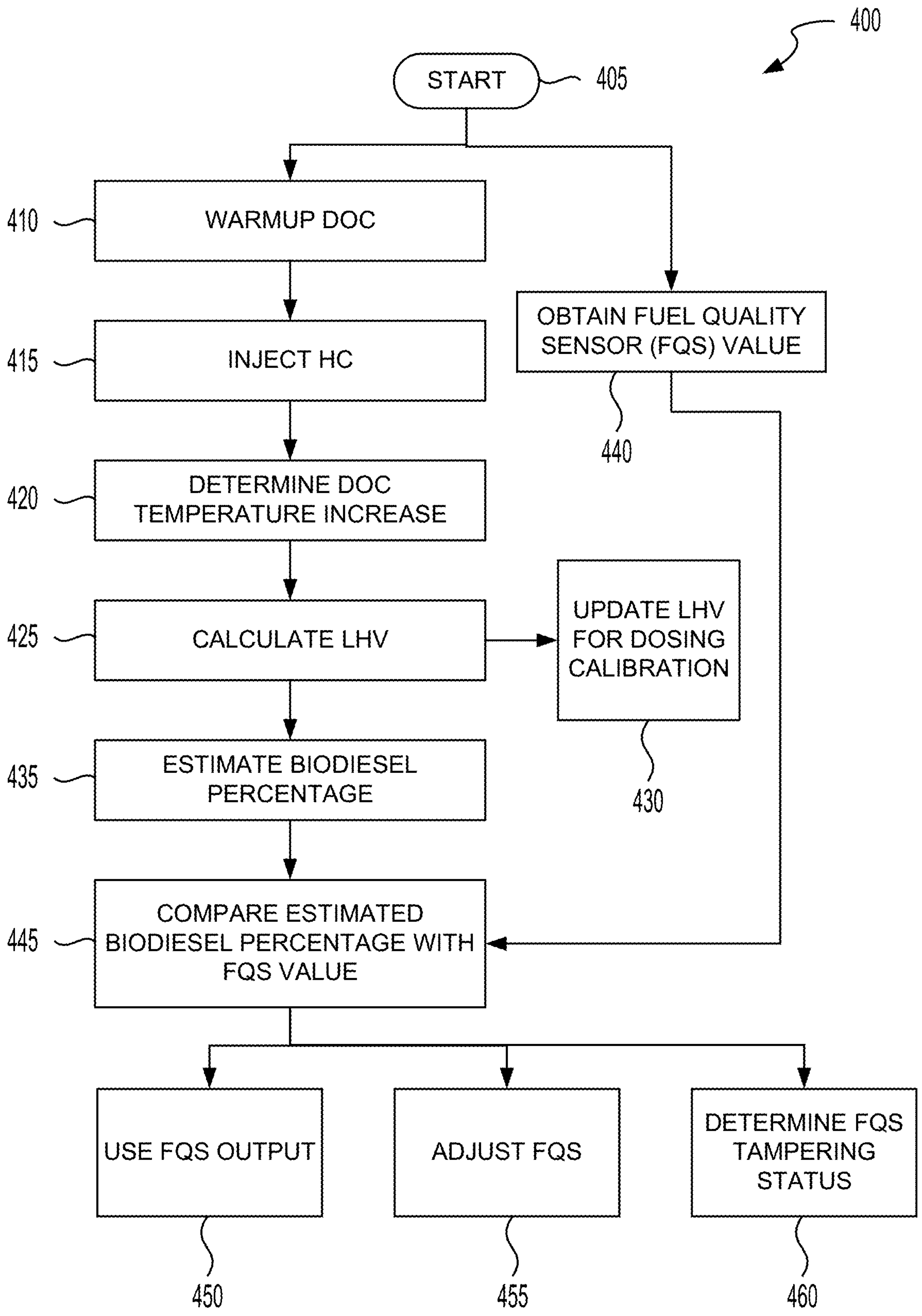
FIG. 4 illustrates a method to detect conditions using virtual sensors of an aftertreatment system, according to an example implementation.

FIG. 4 illustrates an example method 400 to detect conditions using virtual sensors. For example, the biodiesel virtual sensor can be used for estimating biodiesel blend, determining tampering status of a physical sensor, updating a lower heating value for dosing calibration, and/or adjusting the physical sensor. The method 400 can be implemented by any of various systems and devices described herein, including but not limited to the aftertreatment system 100 and/or the controller 160 (e.g., processor) described with reference to FIGS. 1 and 2. The method 400 can be implemented in any of various modalities, including but not limited to real-time techniques in which one or more aspects of the method 400 are executed responsive to real-time sensor data detected regarding inlet DOC and outlet DOC temperatures, amount of hydrocarbons, and exhaust gas flow rate.

The method 400 includes starting the engine of the aftertreatment system (405). For example, the engine 101 of the aftertreatment system 100 can be started after fueling or refueling. An ignition key can be turned to start the engine 101 of the aftertreatment system 100. The engine can be started by the at least one controller 160.

The method 400 includes heating the DOC (410). For example, heating the DOC can include warming up the DOC (e.g., DOC warmup). The DOC can be heated to a temperature that is greater than the light-off temperature of the DOC. The light-off temperature of the DOC can include a temperature at which the DOC catalyzes combustion of the hydrocarbons (e.g., burn fuel). Heating the DOC can be controlled by the at least one controller 160.

The method 400 includes injecting hydrocarbons (415). The hydrocarbons can be injected during an injection event (e.g., hydrocarbon injection event). The injection event can include injection of hydrocarbons upstream of the DOC. Injecting the hydrocarbons can be controlled by the at least one controller 160. The injection event can include injection of hydrocarbons to the DOC. The injection event can occur responsive to a determination that the temperature of the DOC (e.g., first temperature, second temperature) is greater than the light-off temperature of the DOC. Hydrocarbons (e.g., fuel) can be dosed into the aftertreatment system 100.

The method 400 includes determining a temperature increase of the DOC (420). The temperature increase of the DOC can be determined by the at least one controller 160. The temperature increase can be determined using one or more sensors. For example, the temperature increase can be determined using thermistors at the DOC inlet and DOC outlet. The temperature increase can include the difference between the temperature of the exhaust gas at the DOC outlet and the temperature of the exhaust gas at the DOC inlet. The temperature increase of the DOC can be used in the calculate of LHV.

The method 400 includes calculating an LHV (425). The LHV can be calculated by the at least one controller 160. The LHV can be calculated based on one or more of the temperature of the exhaust gas at the DOC inlet, the temperature of the exhaust gas at the DOC outlet, the amount of hydrocarbons, and the flow rate of the exhaust gas (e.g., exhaust mass flow). The electronics control unit (ECM) can be used to calculate the flow rate of the exhaust gas. The ECM can perform the calculation based on the engine operating conditions. The engine operating conditions can include, for example, the speed of the engine, the torque of the engine, the charge flow through the engine, ambient air temperature, fueling quantities, and the turbocharger speed.

The method 400 includes updating the LHV for dosing calibration (430). The LHV can be updated by the at least one controller 160. The LHV can be updated to determine the hydrocarbon dose for other protocols (e.g., procedures), such as regenerating the filter 140 (e.g., diesel particulate filter), cleaning out deposits in the aftertreatment system 100, and/or desulfurization of the aftertreatment system 100. Desulfurization of the aftertreatment system 100 can include removing sulfur from the catalyst (e.g., DOC catalyst). Updating the LHV can lead to updating the hydrocarbon injection fuel quantity to obtain the appropriate temperature (e.g., DOC outlet temperature, second temperature) for these protocols.

The method 400 includes estimating biodiesel percentage (435). The biodiesel percentage can be estimated by the at least one controller 160. The percentage of biodiesel in the fuel can be estimated by correlating the LHV to a percentage of biodiesel. The correlation can be performed using, for example, interpolation of measured data, lookup tables, simulated data, equations, or algorithms. The correlation can be tailored to specific kinds or types of biodiesel sources. The correlation can be tailored to specific regions of the same biodiesel type. The correlation can be based on one or more prediction models for estimating biodiesel fraction based on LHV. The percentage of biodiesel in the fuel can be estimated after fueling a vehicle, instead of after implementation of one or more protocols, such as regenerating the filter 140, cleaning out deposits in the aftertreatment system 100, and/or desulfurization. The estimation can occur after the vehicle has been refueled.

The method 400 includes obtaining a fuel quality sensor value (440). The fuel quality sensor value can be obtained by the at least one controller 160. The fuel quality sensor value can include the percentage of biodiesel in the fuel measured by the physical sensor. The fuel quality sensor value can be obtained during the time period for performing steps (410) through (435). For example, the fuel quality sensor value can be obtained in parallel with calculating the LHV and estimating the biodiesel quality based on the LHV. The fuel quality sensor value can include a fuel quality sensor reading (e.g., fuel quality sensor data). The fuel quality sensor reading can include at least one of the density of the fuel, the dynamic viscosity of the fuel, the dielectric constant of the fuel, or the resistivity of the fuel.

The method 400 includes comparing the estimated biodiesel percentage with the fuel quality sensor value (445). The estimated biodiesel percentage can be compared with the fuel quality sensor value by the at least one controller 160. The percentage of biodiesel in the fuel based on the LHV can include an estimated percentage of biodiesel in the fuel. The percentage of biodiesel in the fuel based on the LHV can be compared to the percentage of biodiesel in the fuel measured by the physical sensor by subtracting the value for the percentage of biodiesel in the fuel based on the LHV from the value for the percentage of biodiesel in the fuel measured by the physical sensor. The percentage of biodiesel in the fuel based on the LHV can be compared to the percentage of biodiesel in the fuel measured by the physical sensor by subtracting the value for the percentage of biodiesel in the fuel measured by the physical sensor from the value for the percentage of biodiesel in the fuel based on the LHV. The method 400 can include comparing the fuel quality sensor data to the percentage of biodiesel in the fuel based on the LHV. The method 400 can include using at least one of the density of the fuel, the dynamic viscosity of the fuel, the dielectric constant of the fuel, or the resistivity of the fuel to calculate the percentage of biodiesel in the fuel.

The method 400 includes using the fuel quality sensor output (450). The fuel quality sensor output can be used by the at least one controller 160. The fuel quality sensor can be used responsive to the determination that the difference between the percentage of biodiesel in the fuel based on the LHV and the percentage of biodiesel in the fuel measured by the physical sensor is less than the threshold value. For example, the at least one controller 160 can determine that the physical sensor and/or the aftertreatment system 100 has not been tampered with (e.g., the physical sensor is measuring the percentage of biodiesel in the primary fuel and the percentage of biodiesel in the fuel based on the LHV is estimated for the primary fuel). The method 400 can include using the fuel quality sensor output based on one or more machine learning models or algorithms.

The method 400 includes adjusting the fuel quality sensor (455). The fuel quality sensor can be adjusted by the at least one controller 160. The fuel quality sensor can be adjusted (e.g., modified, calibrated) responsive to the determination that the difference between the percentage of biodiesel in the fuel based on the LHV and the percentage of biodiesel in the fuel measured by the physical sensor is greater than the threshold value. For example, the fuel quality sensor can be adjusted relative to a reference. The fuel quality sensor can be adjusted to decrease errors in the values sensed by the fuel quality sensor. The fuel quality sensor can be adjusted to correct for any shifts in the range of the fuel quality sensor. The fuel quality sensor can be adjusted to correct for any errors due to mechanical wear of the fuel quality sensor. The adjustment of the fuel quality sensor can be sufficient if it is determined that a difference between the percentage of biodiesel in the fuel based on the LHV and the percentage of biodiesel in the fuel measured by the physical sensor is less than a threshold value. The method 400 can include adjusting the fuel quality sensor using data from one or more machine learning models or algorithms.

The method 400 includes determining the fuel quality sensor tampering status. The fuel quality sensor tampering status can be determined by the at least one controller 160. The at least one controller 160 can determine that the physical sensor and/or the aftertreatment system 100 has been tampered with (e.g., the physical sensor is measuring the percentage of biodiesel in the secondary fuel and the percentage of biodiesel in the fuel based on the LHV is estimated for the primary fuel). The estimated biodiesel percentage or blend can be compared with the fuel quality sensor value to determine if the physical sensor has been tampered with. It can be determined that the physical sensor has been tampered with if it is determined that a difference between the percentage of biodiesel in the fuel based on the LHV and the percentage of biodiesel in the fuel measured by the physical sensor is greater than a threshold value. It can be determined that the physical sensor has not been tampered with if it is determined that a difference between the percentage of biodiesel in the fuel based on the LHV and the percentage of biodiesel in the fuel measured by the physical sensor is less than a threshold value. The fuel quality sensor tampering status can include an indication of whether the fuel quality sensor has been tampered with. The tampering status (e.g., fuel quality sensor tampering status) can be output as an indication that the physical sensor has undergone tampering. The tampering status of the physical sensor can include whether or not the physical sensor has been tampered with. For example, the physical sensor can be used to sense fuel (e.g., secondary fuel) that is not the same fuel as the fuel (e.g., primary fuel, actual fuel) used to run the engine. In this case, the physical sensor can output the percentage of biodiesel for the secondary fuel while the percentage of biodiesel based on the LHV is estimated for the primary fuel. Since one of the purposes of the physical sensor can be to measure the fuel quality of the fuel used to run the engine, if the percentage of biodiesel in the fuel based on the LHV is different from the percentage of biodiesel measured by the physical sensor, this may be an indication that the physical sensor and/or the aftertreatment system 100 has been tampered with. There may be a difference between the percentage of biodiesel in the fuel measured by the physical sensor and the percentage of biodiesel in the fuel based on the LHV due to error in one or more of the physical sensor measurements or LHV calculation.

Figure 5:
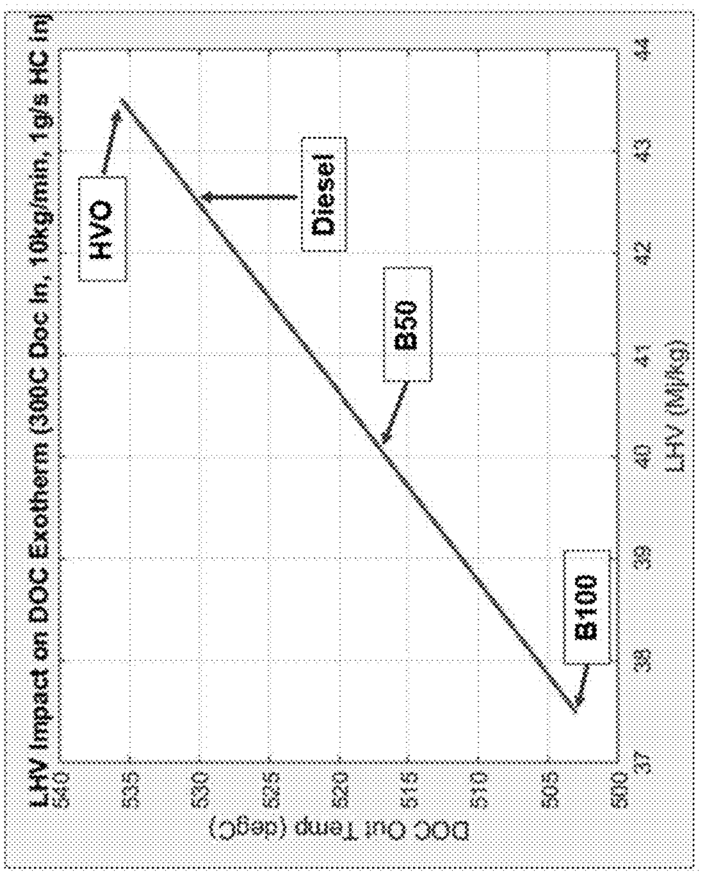
FIG. 5 illustrates a plot of DOC outlet temperature vs. LHV, and a table of various fuel blends and corresponding LHV and DOC outlet temperature values, according to an example implementation.

FIG. 5 illustrates a plot of DOC outlet temperature vs. LHV, and a table of various fuel blends and corresponding LHV and DOC outlet temperature values, according to an example implementation. The data plotted can include a system with a DOC inlet temperature of 300° C., an amount of hydrocarbons injected of 1 g/ms, and a flow rate of the exhaust gas of 10 kg/min. The plot can include simulated results. Pure biodiesel (B100) can have an LHV that is less than the LHV of a biodiesel blend with 50% biodiesel (B50). B100 can have an LHV that is less than the LHV of standard diesel (e.g., diesel). B100 can have an LHV that is less than the LHV of hydrotreated vegetable oil (HVO). B50 can have an LHV that is less than the LHV of diesel. B50 can have an LHV that is less than the LHV of HVO. Diesel can have an LHV that is less than the LHV of HVO. The plot can show the LHV impact on the DOC exotherm. For example, the DOC outlet temperature for an engine using B100 can be less than the DOC outlet temperature for an engine using B50. The DOC outlet temperature for an engine using B100 can be less than the DOC outlet temperature for an engine using diesel. The DOC outlet temperature for an engine using B100 can be less than the DOC outlet temperature for an engine using HVO. The DOC outlet temperature for an engine using B50 can be less than the DOC outlet temperature for an engine using diesel. The DOC outlet temperature for an engine using B50 can be less than the DOC outlet temperature for an engine using HVO. The DOC outlet temperature for an engine using diesel can be less than the DOC outlet temperature for an engine using HVO.

The table illustrates the DOC outlet temperatures values corresponding to the fuel blends. Standard diesel (e.g., petroleum-based diesel) can have an LHV of 42.7 MJ/kg and a DOC outlet temperature of 531.2° C. Hydrotreated vegetable oil can have an LHV of 44 MJ/kg and a DOC outlet temperature of 538.2° C. Pure biodiesel (e.g., B100) can have an LHV of 37.5 MJ/kg and a DOC outlet temperature of 503.0° C. The LHV of pure biodiesel can be less than the LHV of petroleum-based diesel. The DOC outlet temperature for a system using pure biodiesel can be less than the DOC outlet temperature for a system using petroleum-based diesel. A biodiesel blend with 50% biodiesel (e.g., B50) can have an LHV of 40.1 MJ/kg and a DOC outlet temperature of 517.1° C. The LHV of a biodiesel blend with 50% biodiesel can be less than the LHV of petroleum-based diesel. The DOC outlet temperature for a system using 50% biodiesel can be less than the DOC outlet temperature for a system using petroleum-based diesel. A biodiesel blend with 20% biodiesel (e.g., B20) can have an LHV of 41.7 MJ/kg and a DOC outlet temperature of 525.8° C. The LHV of a biodiesel blend with 20% biodiesel can be less than the LHV of petroleum-based diesel. The DOC outlet temperature for a system using 20% biodiesel can be less than the DOC outlet temperature for a system using petroleum-based diesel. The LHV for diesel can be in a range of 42.5 to 44.0 MJ/kg and the LHV for pure biodiesel can be in a range of 36.5 to 38.0 MJ/kg. Biodiesel can have a smaller LHV compared to that of petroleum-based diesel. Therefore, for a given hydrocarbon dosing quantity, the temperature increase across the DOC can be reduced for biodiesel compared to petroleum-based diesel.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random-access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The methods described herein, or operations thereof, may be implemented in machine-readable medium for execution by various types of processors of the controller. A circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The computer readable program code may execute entirely on a local computer (such as via the controller 160 of FIG. 1), partly on the local computer, as a stand-alone computer-readable package, partly on the local computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the term "about," or similar terms, generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A non-transitory computer-readable media having computer-readable instructions stored thereon that, when executed by at least one controller, cause the at least one controller to:
- control an amount of hydrocarbons provided upstream of a diesel oxidation catalyst (DOC);
- determine a first temperature of exhaust gas at an inlet of the DOC, the exhaust gas produced from combustion of fuel;
- determine a second temperature of the exhaust gas at an outlet of the DOC;
- calculate a lower heating value (LHV) of the fuel based on the first temperature, the second temperature, the amount of hydrocarbons, and a flow rate of the exhaust gas; and
- estimate a percentage of biodiesel in the fuel based on the LHV.

2. The non-transitory computer-readable media of claim 1, wherein the at least one controller is configured to output an indication of the estimated percentage of biodiesel in the fuel.

3. The non-transitory computer-readable media of claim 1, wherein the at least one controller is configured to determine that the first temperature is greater than or equal to a light-off temperature of the DOC prior to controlling the amount of hydrocarbons provided upstream the DOC.

4. The non-transitory computer-readable media of claim 1, wherein to calculate the LHV, the at least one controller is configured to determine a difference between the second temperature and the first temperature.

5. The non-transitory computer-readable media of claim 1, wherein the at least one controller is configured to compare the percentage of biodiesel in the fuel based on the LHV with a percentage of biodiesel in the fuel measured by a physical sensor.

6. The non-transitory computer-readable media of claim 5, wherein the at least one controller is configured to determine a tampering status of the physical sensor responsive to a determination that a difference between the percentage of biodiesel in the fuel based on the LHV and the percentage of biodiesel in the fuel measured by the physical sensor is greater than a threshold value.

7. The non-transitory computer-readable media of claim 6, wherein the at least one controller is configured to output an indication of the tampering status.

8. The non-transitory computer-readable media of claim 5, wherein the at least one controller is configured to estimate the percentage of biodiesel in the fuel based on at least one of a density of the fuel, a dynamic viscosity of the fuel, a dielectric constant of the fuel, or a resistivity of the fuel.

9. The non-transitory computer-readable media of claim 5, wherein the at least one controller is configured to estimate a percentage of hydrotreated vegetable oil in the fuel based on the LHV.

10. The non-transitory computer-readable media of claim 1, wherein:

the at least one controller is configured to control a first injection of hydrocarbons prior to calculating the LHV; and the at least one controller is configured to control a second injection of hydrocarbons based on the calculated LHV.

11. The non-transitory computer-readable media of claim 1, wherein the at least one controller is configured to control the first temperature, the amount of hydrocarbons that are injected, and the flow rate of the exhaust gas to achieve the second temperature of less than 450° C.

12. The non-transitory computer-readable media of claim 1, wherein:

the at least one controller is configured to initiate an injection event comprising injection of hydrocarbons upstream of the DOC; and the injection event occurs over a period of time of less than a threshold time.

13. The non-transitory computer-readable media of claim 12, wherein the threshold time is five minutes.

14. The non-transitory computer-readable media of claim 1, wherein the flow rate of the exhaust gas is determined based on one or more engine operating conditions.

15. An aftertreatment system comprising the at least one controller and the DOC of claim 1.

16. The aftertreatment system of claim 15, further comprising a hydrocarbon insertion assembly coupled with the at least one controller, the at least one controller configured to control injection of hydrocarbons upstream of the DOC.

17. A method comprising:

controlling, by at least one controller, an amount of hydrocarbons provided upstream of a diesel oxidation catalyst (DOC);

determining, by the at least one controller, a first temperature of exhaust gas at an inlet of the DOC, the exhaust gas produced from combustion of fuel;

determining, by the at least one controller, a second temperature of the exhaust gas at an outlet of the DOC;

calculating, by the at least one controller, a lower heating value (LHV) of the fuel based on the first temperature, the second temperature, the amount of hydrocarbons, and a flow rate of the exhaust gas; and estimating, by the at least one controller, a percentage of biodiesel in the fuel based on the LHV.

18. The method of claim 17, further comprising:

outputting, by the at least one controller, an indication of the estimated percentage of biodiesel in the fuel.

19. The method of claim 17, further comprising:

initiating, by the at least one controller, an injection event comprising injection of hydrocarbons upstream of the DOC;

wherein the injection event occurs over a period of time of less than five minutes.

20. The method of claim 17, further comprising:

estimating, by the at least one controller, the percentage of biodiesel in the fuel based on at least one of a density of the fuel, a dynamic viscosity of the fuel, a dielectric constant of the fuel, or a resistivity of the fuel.

* * * * *